(12) United States Patent
Douglas et al.

(10) Patent No.: US 11,472,542 B2
(45) Date of Patent: Oct. 18, 2022

(54) MAGNETIC ROTOR ALIGNMENT FOR AIRCRAFT

(71) Applicant: L3HARRIS LATITUDE LLC, Melbourne, FL (US)

(72) Inventors: Jason Michael K. Douglas, Tucson, AZ (US); Justin Armer, Tucson, AZ (US); Carlos Murphy, Tucson, AZ (US)

(73) Assignee: L3HARRIS LATITUDE LLC, Tucson, AZ (US)

( * ) Notice: Subject to any disclaimer, the term of this patent is extended or adjusted under 35 U.S.C. 154(b) by 16 days.

(21) Appl. No.: 16/705,922

(22) Filed: Dec. 6, 2019

(65) Prior Publication Data

US 2020/0108918 A1    Apr. 9, 2020

Related U.S. Application Data

(62) Division of application No. 15/185,445, filed on Jun. 17, 2016, now Pat. No. 10,501,173.

(51) Int. Cl.
| | |
|---|---|
| *B64C 27/30* | (2006.01) |
| *B64C 39/02* | (2006.01) |
| *B64C 29/00* | (2006.01) |
| *B64C 9/00* | (2006.01) |
| *B64D 27/24* | (2006.01) |
| *B64C 5/02* | (2006.01) |

(52) U.S. Cl.
CPC ............ *B64C 27/30* (2013.01); *B64C 9/00* (2013.01); *B64C 29/0025* (2013.01); *B64C 29/0033* (2013.01); *B64C 39/024* (2013.01); *B64D 27/24* (2013.01); *B64C 5/02* (2013.01); *B64C 2009/005* (2013.01); *B64C 2201/042* (2013.01); *B64C 2201/044* (2013.01); *B64C 2201/088* (2013.01); *B64C 2201/108* (2013.01)

(58) Field of Classification Search
CPC ... B64C 27/30; B64C 39/024; B64C 29/0033; B64C 9/00; B64C 29/0025; B64C 27/24; B64C 2201/108; B64C 2201/042; B64C 2201/044; B64C 2201/088; B64C 5/02; B64C 2009/005
See application file for complete search history.

(56) References Cited

U.S. PATENT DOCUMENTS

| | | | | |
|---|---|---|---|---|
| 4,603,271 A | * | 7/1986 | Maruyama | .......... F04D 25/0653 |
| | | | | 310/156.12 |
| 7,456,541 B2 | * | 11/2008 | Horng | ................. F04D 25/0653 |
| | | | | 310/156.32 |

(Continued)

*Primary Examiner* — Medhat Badawi
*Assistant Examiner* — Vicente Rodriguez
(74) *Attorney, Agent, or Firm* — Sheppard, Mullin, Richter & Hampton LLP

(57) ABSTRACT

An aircraft motor includes a bearing assembly including a first plurality of rotor alignment magnets; a magnet support structure fixedly mounted on a shaft of the motor in a spaced apart relation to the bearing assembly, the magnet support structure including a second plurality of rotor alignment magnets such that when the vertical thrust engine is disengaged, attraction between the first and second rotor alignment magnets causes the magnet support structure to rotate relative to the bearing assembly to an alignment position defined by the relative placement of north and south poles of the first and second plurality of rotor alignment magnets.

20 Claims, 4 Drawing Sheets

(56) References Cited

U.S. PATENT DOCUMENTS

| | | | |
|---|---|---|---|
| 10,435,144 B2* | 10/2019 | Zhang | B64C 27/32 |
| 2006/0060708 A1* | 3/2006 | Decker | E05B 81/25 |
| | | | 244/129.5 |
| 2017/0166304 A1* | 6/2017 | Erdozain, Jr | B64C 39/024 |
| 2017/0225779 A1* | 8/2017 | Gamble | B64C 29/0091 |

* cited by examiner

MAGNETIC ROTOR ALIGNMENT FOR AIRCRAFT

CROSS REFERENCE TO RELATED APPLICATIONS

This application is a divisional of U.S. patent application Ser. No. 15/185,445, filed Jun. 17, 2016. The specification of which is incorporated in its entirety herein by reference.

TECHNICAL FIELD

The disclosed technology relates generally to aircraft, and more particularly, some embodiments relate to aligning vertical propulsion rotors in VTOL aircraft to minimize drag during non-VTOL flight operations.

The disclosed technology relates generally to aircraft, and more particularly, some embodiments relate to aligning vertical propulsion rotors in VTOL aircraft to minimize drag during non-VTOL flight operations.

DESCRIPTION OF THE RELATED ART

Unmanned aircraft have become ubiquitous in today's society. Their importance and value has grown dramatically in recent years, leading to widespread adoption in commercial, military and consumer market sectors. Part of the reason for their popularity is their low cost and small form factor as compared to piloted aircraft.

Hybrid aircraft use a combination of vertical takeoff and landing (VTOL) propulsion systems to allow the aircraft to take off and land vertically (e.g., like a helicopter) and forward propulsion systems for fixed-wing flight. A hybrid quadrotor aircraft, for example, uses four VTOL rotors and one or more forward propulsion rotors. Quadrotor, octorotor, and other multirotor configurations for the VTOL propulsion system are popular because they allow attitude control as well as control of angular acceleration, rate, and even aircraft velocity and position. That is, flight dynamics can be controlled by individually controlling the motor power or RPM of each rotor to control the torque on the aircraft.

During transition to fixed wing flight as well as during fixed wing flight, the forward thrust rotor is used to accelerate the aircraft. During most fixed wing flight operations, the VTOL rotors are unused. To conserve fuel or battery power, the VTOL propulsion system is shut down during this fixed wing flight. However, if the VTOL rotors are uncontrolled, they can introduce drag, decreasing the efficiency of the aircraft in fixed wing mode. Accordingly, hybrid VTOL aircraft have included alignment systems to align the VTOL rotors parallel to the flight path.

Magnets have been used in some conventional systems to align the VTOL rotors in the direction of flight. However, these solutions, which involved opposing pairs of magnets oriented in alternating North and South positions to align the VTOL rotors with the flight path. However, with large motors, the motors often 'stuck' in the wrong position or the alignment forces were insufficient to align the VTOL rotors.

BRIEF SUMMARY OF EMBODIMENTS

According to various embodiments of the disclosed technology systems and methods for aligning one or more VTOL rotors in a hybrid VTOL aircraft are provided. In some embodiments, an aircraft engine, includes a motor; a shaft attached to the motor and extending along a thrust axis of the motor; a bearing assembly defining a first surface oriented toward the motor, and a second surface opposite the first surface. The bearing assembly may include: an aperture to accept the shaft; a bearing mounted to the aperture and positioned to rotatably support the shaft through the aperture; and a first plurality of rotor alignment magnets fixedly mounted in the bearing assembly and oriented such that their magnetic axes are substantially parallel to the thrust axis, wherein the first plurality of rotor alignment magnets are mounted to provide an alternating pattern of north and south poles facing in a direction away from the motor. The motor may further include a magnet support structure fixedly mounted on the shaft in a spaced apart relation to the bearing assembly, the magnet support structure including a second plurality of rotor alignment magnets mounted to provide an alternating pattern of north and south poles facing in a direction toward the bearing assembly; wherein the first and second plurality of rotor alignment magnets are positioned such that when the motor is disengaged, attraction between the first and second rotor alignment magnets causes the magnet support structure to rotate relative to the bearing assembly to an alignment position defined by the relative placement of the north and south poles of the rotor alignment magnets. The bearing assembly may include a plurality of mounting points to fixedly mount the motor to an aircraft support structure.

The alignment position may be a position in which a thrust rotor mounted to the shaft is oriented substantially parallel to the longitudinal axis of the aircraft. Alternatively, the alignment position may be a position in which a thrust rotor mounted to the shaft is oriented substantially parallel to the direction of the apparent wind of the aircraft when the aircraft is in motion. Alternatively, the alignment position may be a position in which a thrust rotor mounted to the shaft is oriented within +/−5° of the longitudinal axis of the aircraft.

The aircraft engine may further include a thrust rotor, wherein the shaft comprises a first portion extending from the motor and supporting the thrust rotor, and a second portion extending from the motor and supporting the magnet support structure. The first and second portions of the shaft may include a single shaft extending from at least the thrust rotor to at least the magnet support structure, or separate sections of the shaft, each mechanically coupled directly or indirectly to the motor. The motor may be an electric motor or an internal combustion engine.

In other embodiments, An aircraft, may include: a forward propulsion system comprising a forward thrust engine and a first rotor coupled to the forward thrust engine; a vertical propulsion system comprising a vertical thrust engine; a shaft coupled to the vertical thrust engine and extending along a thrust axis of the vertical thrust engine; and a second rotor fixedly mounted to a first end of the shaft distal to the vertical thrust engine; a bearing assembly including mounting structures to fixedly mount the vertical thrust engine to a support structure of the aircraft, the bearing assembly including a first plurality of rotor alignment magnets; and a magnet support structure fixedly mounted on the shaft in a spaced apart relation to the bearing assembly, the magnet support structure including a second plurality of rotor alignment magnets; wherein the first and second plurality of rotor alignment magnets are positioned such that when the vertical thrust engine is disengaged, attraction between the first and second rotor alignment magnets causes the magnet support structure to rotate relative to the bearing assembly to an alignment position defined by the relative placement of north and south poles of the first and second plurality of rotor alignment magnets.

The first plurality rotor alignment magnets may be mounted to provide an alternating pattern of north and south poles facing in a direction toward the magnet support structure, and the second plurality of rotor alignment magnets may be mounted to provide an alternating pattern of north and south poles facing in a direction toward the bearing assembly.

The alignment position may be a position in which a thrust rotor mounted to the shaft is oriented substantially parallel to the longitudinal axis of the aircraft. Alternatively, the alignment position may be a position in which a thrust rotor mounted to the shaft is oriented substantially parallel to the direction of the apparent wind of the aircraft when the aircraft is in motion. Alternatively, the alignment position may be a position in which a thrust rotor mounted to the shaft is oriented within +/−5° of the longitudinal axis of the aircraft.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing alignment of thrust rotors in a multirotor VTOL propulsion system. In various embodiments, a new motor mount and bearing housing is provided and configured to include a plurality of magnets disposed about the shaft in alternating orientations. A complimentary alignment plate is provided on the motor or motor shaft, also with a plurality of magnets disposed about the shaft in alternating orientations. When power is removed from the motor, the force of the magnets in the bearing structure and the alignment plate cause the motor to rotate to an alignment position in which the VTOL rotor is aligned in a desired orientation. For example, the desired orientation may be in line or substantially in line with the longitudinal axis of the aircraft, in further embodiments, the alignment position may be a position in which a VTOL rotor mounted to the shaft is oriented within a few degrees of the longitudinal axis of the aircraft. This can be for example, +/−2°, +/−3°, +/−4°, +/−5° of the longitudinal axis of the aircraft, or within some other offset of the longitudinal axis.

Figure 1:
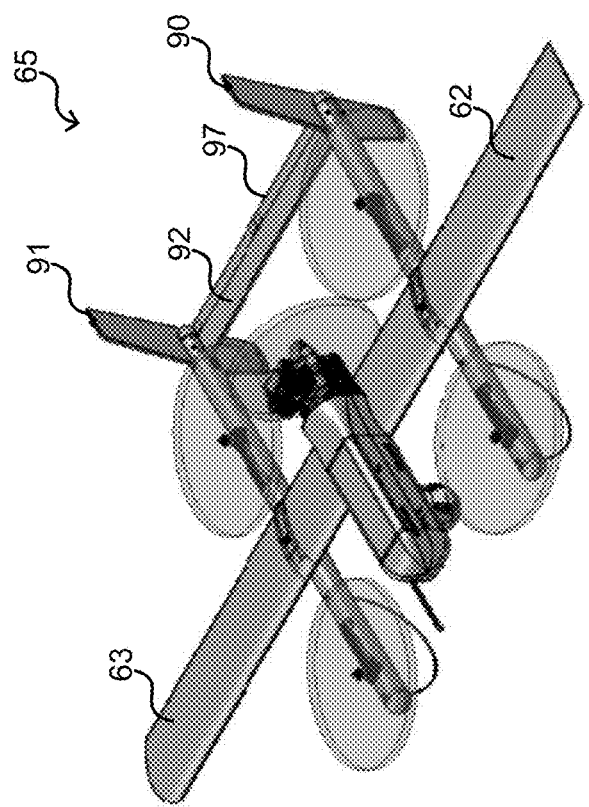
FIG. 1 illustrates an example unmanned vertical take-off and landing (VTOL) aircraft with which embodiments of the technology disclosed herein may be implemented.
Figure 1:
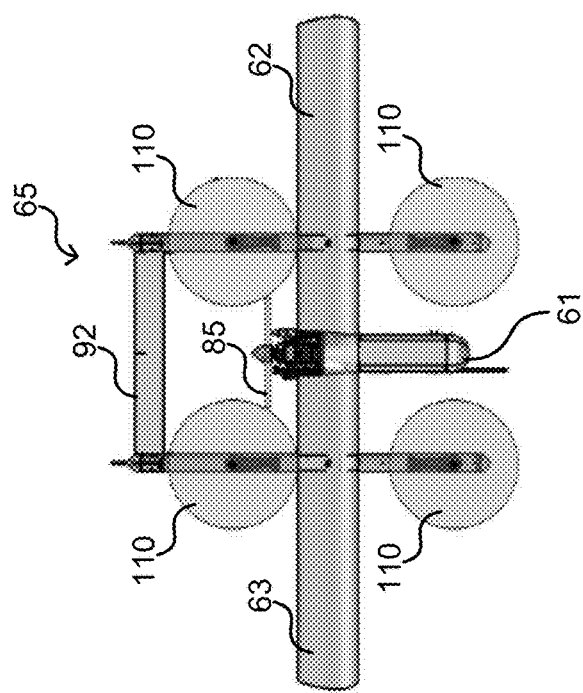
Figure 2:
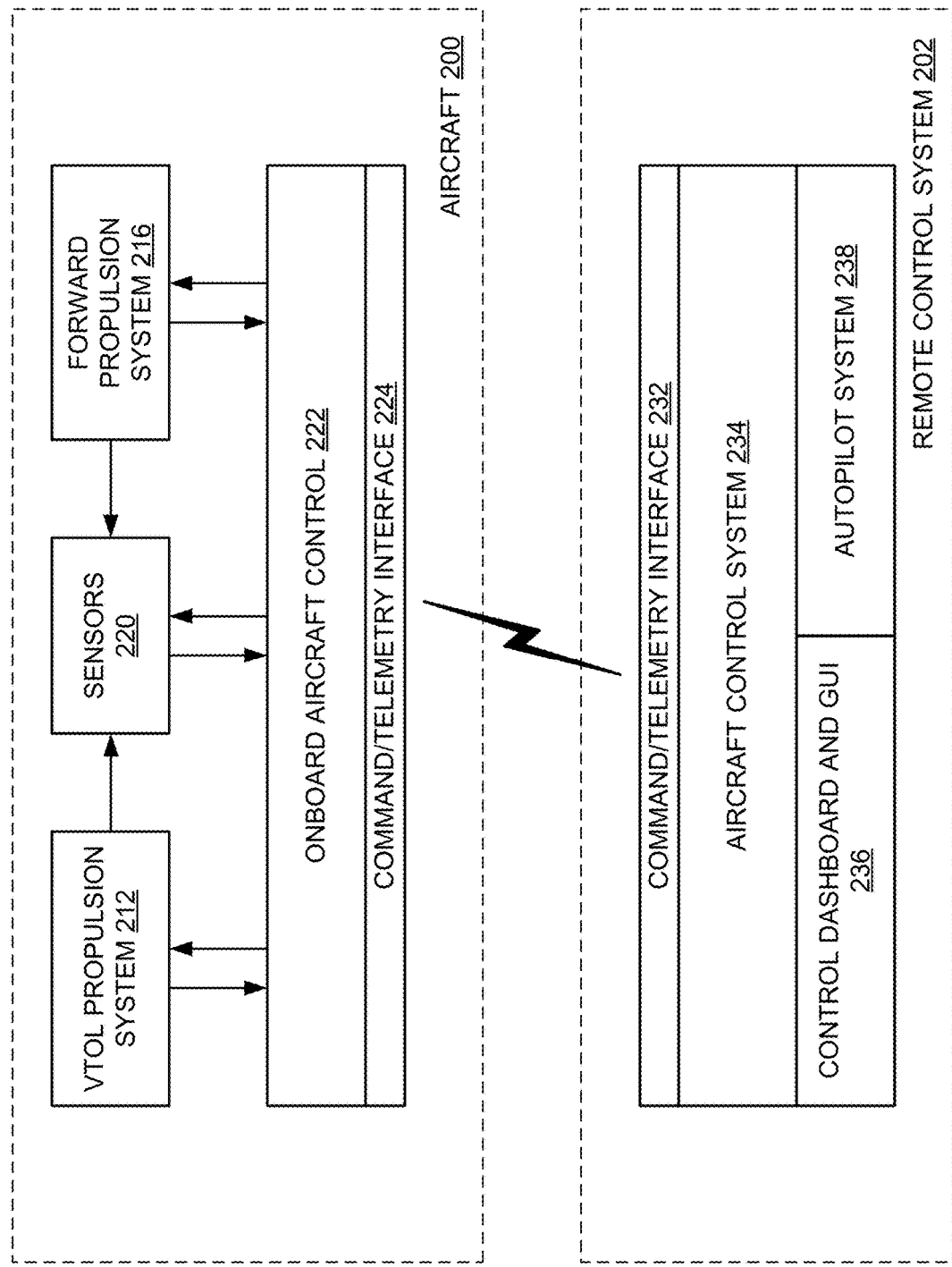
FIG. 2 is a diagram illustrating an example unmanned aircraft with which embodiments of the technology disclosed herein may be implemented.

Before describing embodiments of the systems and methods in detail, it is useful to describe an example aircraft with which such systems and methods can be used. FIG. 1 is a diagram illustrating an example unmanned vertical take-off and landing (VTOL) aircraft with which the technology disclosed herein may be implemented. FIG. 2 is a diagram illustrating an example unmanned aircraft system in including an example unmanned aircraft an example remote control system.

Referring now to FIG. 1, this example aircraft is a hybrid quadrotor aircraft having an airframe that includes fuselage 61, fixed left and right wings 62 and 63, a tail assembly or empennage 65. Also shown are left and right tail boom supports (not numbered for clarity of the illustration), and left and right head boom supports. Left and right wings 62 and 63 are fixed to fuselage 61 to form a fixed wing airframe.

Left wing 62 and right wing 63 are airfoils that produce lift to facilitate aircraft flight. During flight, air passing over the wing creates a region of lower-than-normal air pressure over top surfaces of left and right wings 62 and 63, with a higher pressure existing on the bottom surfaces of left and right wings 62 and 63. This results in a net upward force acting on left and right wings 62 and 63 to generate lift. Left wing 62 is applied to and extends from left side of fuselage 61 and right wing 63 is applied to and extends from right side of fuselage 61. Although not shown, a left aileron is pivotally retained at the rear of left wing 62 near its outer or distal extremity, and a right aileron is pivotally retained at the rear of right wing 63 near the outer or distal extremity of right wing 63.

Empennage 65 gives stability to the aircraft, and is located behind and in spaced-apart relation to the trailing extremity of fuselage 61. In this embodiment, empennage 65 is exemplary of a twin tail assembly or twin tail empennage may include left and right vertical stabilizers 90, 91, and a horizontal stabilizer 92 extending between left and right vertical stabilizers. The left and right vertical stabilizers 90, 91 extend upward from a rear of their corresponding left and right tail boom supports while the horizontal stabilizer 92 is retained between left and right tail boom supports. Rudders, not shown, may be pivotally retained on the trailing edge of left and right stabilizers 90, 91. An elevator 97 is pivotally retained on a rear of horizontal stabilizer 92.

This example aircraft is a hybrid craft including separate rotors for forward and vertical thrust. Particularly, this example is a hybrid quadrotor "X" configuration. Accordingly, this example illustrates a forward thrust rotor 85, which is mounted to the rear extremity of fuselage 61 in front of empennage 65. Forward thrust rotor 85, which provides forward thrust to aircraft 50, is typically powered by a forward propulsion engine, sometimes referred to as a main engine. This example uses a single forward thrust rotor mounted at the rear of the fuselage 61. However, the technology can be applied to aircraft using one or multiple thrust rotors mounted at other positions.

The example aircraft also includes a VTOL propulsion system, or simply a VTOL system, to provide vertical thrust for vertical takeoff and landing operations. This example is a quadrotor VTOL system including four VTOL thrust rotors 110 in a quadrotor "X" pattern for providing vertical lift and yaw control authority to the aircraft. In other applications, the technology disclosed herein may be applied to aircraft having a different quantity of VTOL thrust rotors, or thrust rotors at different locations. VTOL aircraft can include fixed-mount VTOL thrust rotors or pivot-mount VTOL thrust rotors. Forward thrust engines and vertical thrust engines can be internal combustion engines or electric motors or a combination of the two.

Referring now to FIG. 2, the example illustrated in FIG. 2 includes an unmanned aircraft 200 and a remote control system 202 for the aircraft 200. In this example, aircraft 200 includes a VTOL propulsion system 212, a forward propulsion system 216, various sensors 220, and onboard aircraft control system 222, and a command/telemetry interface 224.

VTOL propulsion system 212 includes systems and components used for vertical takeoff and landing. This can include, for example, one or more VTOL thrust rotors, corresponding engines or motors, and other systems associated with VTOL propulsion. In various embodiments, the VTOL rotor or rotors of VTOL propulsion system 212 are oriented horizontally or in an approximately horizontal configuration. The VTOL rotor or rotors of VTOL propulsion system 212 can be mounted in a fixed orientation, or can be movably mounted such that their orientation can be adjusted from the horizontal configuration. VTOL propulsion system 212 can include one or more inputs to receive data, commands, control information, or other information to operate or maintain the propulsion systems or components thereof. For example, a throttle control input can be provided to adjust the throttle setting for the propulsion system. VTOL propulsion system 212 can also include one or more outputs to send data and other information about the propulsion system to other instrumentalities such as, for example, onboard aircraft control system 222 or one or more sensors 220.

Forward propulsion system 216 includes one or more rotors, corresponding engines or motors, and other systems associated with forward propulsion. The rotor or rotors of forward propulsion system 216 are oriented vertically or in an approximately vertical configuration to provide forward or reverse thrust to the aircraft. The rotor or rotors of forward propulsion system 216 are generally mounted in a fixed orientation, but in some embodiments may be movably mounted such that their orientation can be adjusted from the vertical configuration. Forward propulsion system 216 can also include one or more outputs to send data and other information about the propulsion system to other instrumentalities such as, for example, onboard aircraft control system 222 or one or more sensors 220. Forward propulsion system 216 can include one or more inputs to receive data, commands, control information, or other information to operate or maintain the propulsion systems or components thereof. For example, a throttle control input can be provided to adjust the throttle setting for the propulsion system.

Sensors 220 can include one or more various sensors to sense operating parameters of the aircraft and its various systems and subsystems. For example, sensors 220 can include sensors such as temperature sensors, RPM sensors, airspeed sensors, altimeters, position determination systems (e.g. GPS or other position determination systems) vibration sensors, gyros, accelerometers, and so on. Sensors can accordingly sense conditions or other operating parameters of aircraft 200 and its various systems and subsystems. Although illustrated as a single block in this diagram, sensors 220 can include individual discrete sensors disposed in various positions about the aircraft to sense the appropriate parameters.

Command/telemetry interface 224 provides a communication interface to allow aircraft 200 to communicate, preferably two-way, with remote control system 202. Accordingly, command/telemetry interface 224 can include an antenna and a communication transceiver to provide wireless communications so they can receive command and control information from remote control system 202 as well as send data or other telemetry to remote control system 202.

Onboard aircraft control system 222 is provided to control the various components of the aircraft based on commands received from remote control system 202 (e.g., via the command/telemetry interface 224). Onboard aircraft control system 222 can also be configured to receive information from other aircraft components such as, for example, sensor data, and provide that information to command/telemetry interface 224 for transmission to remote control system 202.

Although the functional components of aircraft 200 (e.g., onboard aircraft control system 222 and command/telemetry interface 224) are partitioned in this example in the manner as illustrated in FIG. 2, it is noted that this partitioning is done for clarity of description and by way of example only. After reading this description, one of ordinary skill in the art will understand how different architectures or alternative partitioning can be used for systems of aircraft 200. Additionally, components such as processing devices, memory components, communications buses and so on can be shared among these multiple functional units. Indeed, in some applications, for example, a single microprocessor (whether single or multi-core) system can be used to implement the functions of onboard aircraft control system 222, as well as portions command/telemetry interface 224, sensors 220, and even digital/electronic portions of the various propulsion systems.

Remote control system 202 in this example includes a command/telemetry interface 232, and aircraft control system 234 a control dashboard and user interface 236 and an autopilot system 238. Command/telemetry interface 232 provides a wireless communication interface to aircraft 200. In some embodiments, remote control system 202 can be used to command multiple aircraft, in which case command/telemetry interface 232 can provide a communication interface to multiple aircraft.

Control dashboard and GUI 236 provides a user interface to the remote pilot to allow the pilot to control one or more aircraft such as aircraft 200. Control dashboard and GUI 236 can be configured to provide visual, audible, and tactile feedback and information to the pilot regarding flight of the aircraft and various aircraft parameters. You can also include user input mechanisms to allow the pilot to control the aircraft remotely. These user input mechanisms can include, for example, buttons, switches, levers, joysticks, keys, touchscreen inputs, or other actuators to enable the pilot to provide input and adjust aircraft settings. This can allow the pilot to control, for example, throttle settings for the various propulsion systems, to adjust the rudder and ailerons, and so on.

Inputs from the user are interpreted by aircraft control system 234 to translate user inputs into commands for aircraft control. In some applications, this can be a translation of direct commands such as throttle inputs, rudder control, flap adjustment and so on. Control inputs can also include higher level commands such as rotation rate or rate over ground, etc., which can be translated into aircraft system control commands. These commands are communicated to aircraft 200 via command/telemetry interface 232 and command/telemetry interface 224. Functionality for aircraft control can be distributed among aircraft control system 234 and onboard aircraft control 222 as may be appropriate depending on the system configuration.

An autopilot system 238 can also be provided to control the aircraft via computerized or automated control with little or no input required by a human pilot. Although illustrated in this example as part of remote control system 202, part or all of the functionality of autopilot system 238 can be provided at aircraft 200. Although not illustrated, in some embodiments an onboard autopilot system can be included with the aircraft 200 to enable local autopilot control, which may ease the load on the command/telemetry interfaces.

Although the functional components of remote control system 202 (e.g., aircraft control system 234, control dashboard and GUI 236, autopilot system 238, and command/telemetry interface 232) and aircraft 200 are partitioned in this example in the manner as illustrated in FIG. 2, it is noted that this partitioning is done for clarity of description and by way of example only. After reading this description, one of ordinary skill in the art will understand how different architectures or alternative partitioning can be used for aircraft 200 or remote control system 202. Additionally, components such as processing devices, memory components, communications buses, and so on can be shared among these multiple functional units. Indeed, in some applications, for example, a single microprocessor (whether single or multi-core) system can be used to implement the various described functions of remote control system 202 (e.g., aircraft control system 234, and autopilot system 238, as well as portions of control dashboard in GUI 236 and command/telemetry interface 232) or aircraft 200.

Having thus described an example aircraft and unmanned aircraft system with which one or more aspects of the disclosed technology can be implemented, various embodiments are now described. Although the disclosed technology may be described from time to time herein in terms of this example aircraft, one of ordinary skill in the art reading this disclosure will understand how aspects of the disclosed technology can be implemented with different aircraft and different aircraft configurations. This can include different configurations of unmanned aircraft as well as various configurations of manned aircraft.

Figure 3:
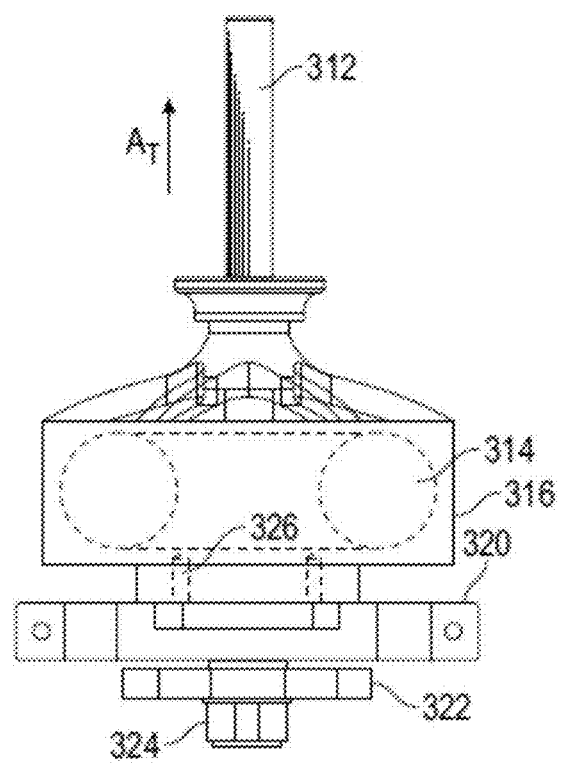
FIG. 3 is a diagram illustrating a side view of an example aircraft motor with magnetic rotor alignment in accordance with embodiments of the technology disclosed herein.
Figure 4:
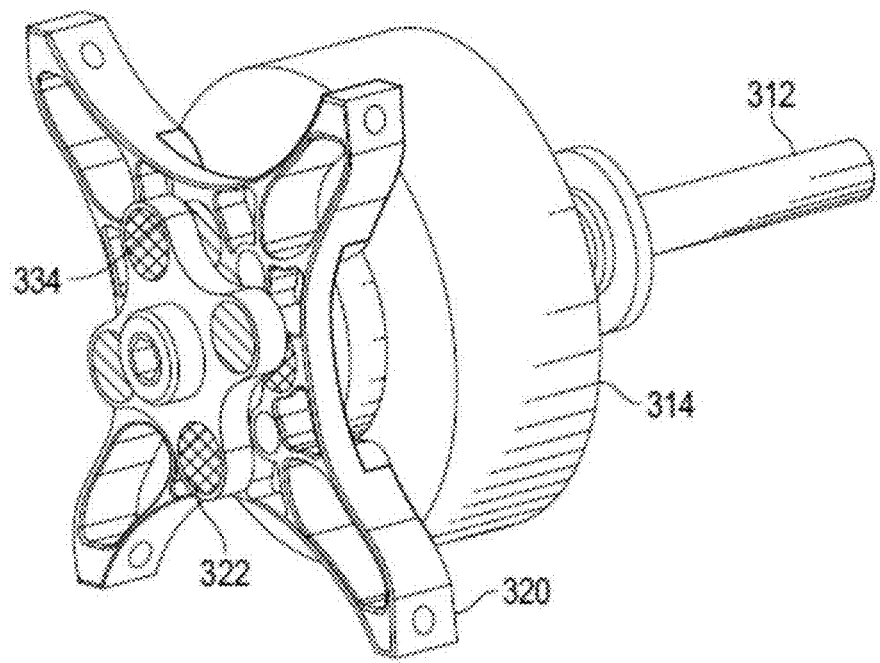
FIG. 4 is a diagram illustrating a plan view of this example motor.

FIG. 3 is a diagram illustrating a side view of an example aircraft motor with magnetic thrust rotor alignment in accordance with embodiments of the technology disclosed herein. FIG. 4 is a diagram illustrating a plan view of this example motor. Referring now to FIGS. 3 and 4, this example illustrates a motor in an outrunner configuration with a stator 314 mounted within a rotor 316 (distinguished from the thrust rotor (e.g., thrust rotor 110) of the aircraft), a shaft 312, a bearing assembly 320, a magnet support structure 322 and a bolt 324. This example also includes a set of alignment magnets 332 in magnet support structure 322, and a complementary set of alignment magnets 334 in bearing assembly 320.

Shaft 312 extends from the motor in a direction along (or substantially along) thrust axis AT. Shaft includes a first portion extending from the top of motor and a second portion extending through bearing assembly 320 and magnet support structure 322. Not illustrated is the aircraft thrust rotor, which may be implemented as, for example, VTOL thrust rotor 110 (distinguished from the rotor 316 of the motor) or other propeller, rotary wing, etc. The thrust rotor (again, distinguished from rotor 316 of the motor) is fixedly mounted to the end of shaft 312 (the top end of shaft 312 in the example illustration of FIG. 3) such that the thrust rotor rotates with shaft 312. Shaft 312 in an outrunner configuration is fixedly mounted to rotor 316 and rotatably extends through the stator 314. Shaft 312 rotates with the revolutions of motor (i.e., as rotor 316 spins) to cause the propeller to rotate for VTOL flight operations. Magnet support structure 322 may also be fixedly mounted to shaft 312 so that it also rotates with revolutions of rotor 316 of the motor. Shaft 312 can be a single shaft extending from the propeller to magnet support structure 322 through stator 314. In other embodiments, shaft 312 can be provided in two or more separate segments.

Although the illustrated example is of an outrunner motor, in other embodiments, the aircraft motor can be implemented in an inrunner configuration in which the rotor is contained and rotates within the outer stator (e.g., the can).

Bearing assembly 320 can include mounting holes or other mounting structures so that the bearing assembly 320 can be fixedly mounted to the aircraft such as, for example, to an aircraft bulkhead or other support structure. In various outrunner embodiments, stator 314 is fixedly mounted to bearing assembly 320 by fastening elements 326. Fastening elements 326 can include screws, bolts, rivets, posts, or other like fastening elements. Mounting the motor (e.g. via stator 314 or other stationary part of the motor) and bearing assembly 320 to a bulkhead allows the motor structure to remain fixed while the motor is operational and shaft 312, magnet support structure 322, rotor 316 and the aircraft rotor (e.g., thrust rotor 110) are free to rotate with revolutions of the motor.

Although motor may connote an electrically powered machine for converting electrical energy into mechanical (e.g., rotational) energy, the term motor as used herein can also apply to other devices for converting other forms of energy into mechanical energy. These can include, for example, internal combustion engines, external combustion engines, pneumatic motors, and so on.

Figure 5:
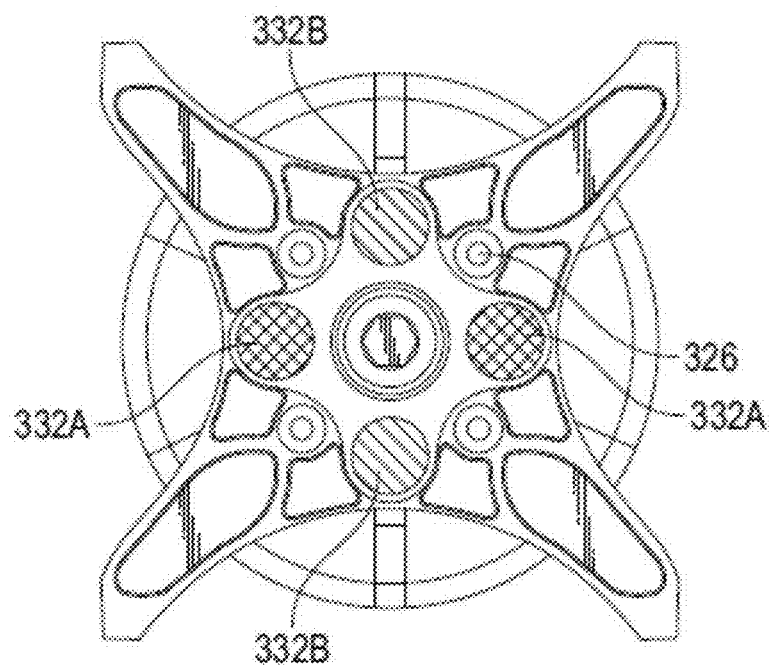
FIG. 5 is a bottom view of the example motor illustrated in FIGS. 3 and 4.

FIG. 5 is a bottom view of the example motor illustrated in FIGS. 3 and 4. FIG. 5 shows bolt 324 axially aligned thrust axis AT. FIG. 5 illustrates the set of alignment magnets 332 is arranged in an alternating configuration of magnets 332A with their North poles oriented toward the top of the structure (i.e., toward the lower portion of bearing assembly 320) and magnets 332B with their South poles oriented toward the top of the structure. Alignment magnets 332 are fixedly mounted in magnet support structure 322 and oriented such that their magnetic axes are substantially parallel to the thrust axis, and may be mounted to provide an alternating pattern of north and south poles facing in a direction toward the motor.

Similarly, the set of alignment magnets 334 in bearing assembly 320 can also be arranged in an alternating configuration of magnets, with alternating North and South poles oriented toward the bottom of bearing assembly 320 (i.e., toward magnet mounting structure 322). Alignment magnets 334 are fixedly mounted in bearing assembly 320 and oriented such that their magnetic axes are substantially parallel to the thrust axis, and may be mounted to provide an alternating pattern of north and south poles facing in a direction away from the motor.

Although these configurations are shown with each magnet (e.g., 332A and 332B in the case of alignment magnets 332) as a single magnet, configurations can be provided in which a magnet (e.g. magnet 332A, 332B) comprises a plurality of individual magnets. In other words there can be groups of magnets in alternating North/South orientations about the bearing assembly 320 and magnet support structure 322.

In operation, when the motor is disengaged or the motive force by the motor is otherwise removed from the shaft 312, shaft 312 is free to rotate absent the alignment magnets. However, the repulsion and attraction forces of alternating-pole arrangement of magnets 332 in 334, cause magnet support structure 322 to rotate relative to bearing assembly 320 such that the upward facing North poles of magnets 332 are attracted to and therefore aligned with the downward facing South poles of magnets 334 (and by the same token the upward facing South poles of magnets 332 are attracted to and aligned with the downward facing North poles of magnets 334). The aircraft rotor is oriented on the shaft such that when magnet support structure 322 and bearing assembly 320 are oriented in this fashion by their respective magnets 332, 334, the aircraft rotor is oriented at least substantially parallel to the flight path to reduce drag induced by the aircraft rotor. In these configurations, the aircraft rotor need not be locked into place with a mechanical locking mechanism. Accordingly, when the motor is disengaged (e.g., when the motor is not providing motive force to the shaft), the magnetic repulsion and attraction of the magnets aligns the aircraft rotor substantially parallel to the flight path. As these embodiments illustrate, implementations can be achieved that provide a passive alignment device to align the aircraft rotor, yet still allow the motor to overcome the alignment force to spin the rotor on command when the motor is reengaged.

Figure 6:
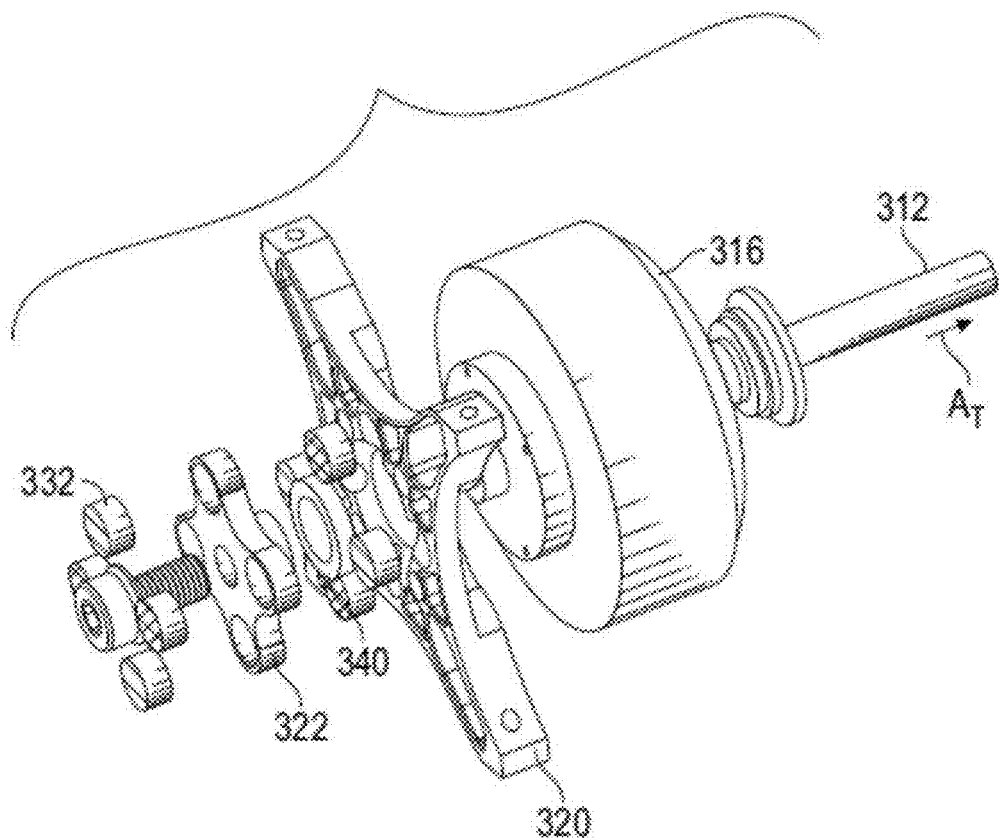
FIG. 6 is a diagram illustrating an exploded view of the example motor illustrated in FIGS. 3-5.

FIG. 6 is a diagram illustrating an exploded view of the example motor illustrated in FIGS. 3-5. As seen in this example, bolt 324 is used to fixedly attach magnet support structure 322 to the lower portion of shaft 312. This causes magnet support structure 322 to rotate with rotation of shaft 312. Magnets 332 are secured to magnet support structure 322 by appropriate attachment means. For example, magnets 332 can be press or friction fit, cemented or glued, held in place with tabs, threaded in position, or otherwise fastened in place. Magnets 334 may be similarly affixed to bearing assembly 320.

This example also shows bearing 340, through which shaft 312 extends. As illustrated, bearing assembly 320 includes an aperture to accept the shaft, and a bearing mounted within the aperture and positioned to rotatably support the shaft through the aperture. The shaft portion extending through the bearing may be a portion of shaft 312 (which as noted above may be one-piece shaft or may comprise multiple separate elements) or it may be a ring machined or otherwise formed as part of magnet support structure 322 that is connected to the end of shaft 312 by bolt 324.

As this example illustrates, the static portion of the alignment device (e.g., bearing assembly 320) may be integrated into the motor base/mount to reduce the number of parts required for magnetic alignment and to likewise reduce the weight of the assembly. This configuration differs from conventional designs in that in this configuration, the bottom assembly of the motor, which houses the rear (i.e., bottom) main bearing, also houses the magnets 334. In such a configuration, magnets 334 are housed in a critical structural part of the motor. This allows more precise control of the spacing between the fixed and rotating magnets, and a lighter overall design.

The strength of the magnets and the spacing between magnet support structure 322 and bearing assembly 320 can be selected to provide sufficient attraction forces between the magnets to maintain thrust rotor alignment during forward flight, yet not so strong that they introduce unnecessary rotational resistance to the motive force applied by the motor during VTOL operations. In the example illustrated in FIG. 3, the spacing provided is 0.066 Mils. In other embodiments, other spacings can be provided such as, for example, in the range of 0.03-0.10 Mils. In further embodiments, still other spacings can be provided. However, it is preferable to minimize the spacing to reduce the volume consumed by the motor assembly. Minimizing the spacing also maximizes the alignment forces with minimum additional weight.

Embodiments illustrated above may be implemented using conventional magnetic materials mounted in orientations such as those described. These may include permanent magnets, such as those made from ferromagnetic or ferrimagnetic materials such as, for example, iron, nickel, cobalt, lodestone, etc. In further embodiments, electromagnets can be used. In still further embodiments, the electromagnets can be programmable or controllable so that the angle of orientation of the thrust rotor in its locked position can be adjusted. For example, a plurality of electromagnets can be positioned around the thrust axis on the bearing assembly 320 and the magnet support structure 322. They can be arranged in a circular or other pattern around the thrust axis. The current supplied to each electromagnet to energize the magnet can be individually controlled so that each magnet, or groups of magnets, can be selectively energized and their polarity can be assigned. Using a plurality of programmable magnets distributed at various points around the thrust axis can allow for thrust rotor alignment positioning beyond positioning at 0° or 180°. For example, positioning electromagnets at intervals of X° around the thrust axis can allow the thrust rotor to be aligned at positions other than at 0° or 180° in X° increments. For example, where the magnets are positioned at 5° intervals, the thrust rotor can be aligned at positions other than 0° or 180° in 5° increments. Thus, the thrust rotor can be aligned slightly off the longitudinal axis of the aircraft to account for cross winds that affect the apparent wind experienced by the aircraft.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An aircraft engine, comprising:
   a motor, wherein the motor comprises a stator mounted within a rotor;
   a shaft attached to the motor and extending along a thrust axis of the motor, wherein the shaft is fixedly mounted to the rotor and rotatably extends through the stator;
   a bearing assembly fixedly mounted to the stator by fastening elements and defining a first surface oriented toward the motor, and a second surface opposite the first surface, the bearing assembly comprising:
     an aperture to accept the shaft;
     a bearing mounted to the aperture and positioned to rotatably support the shaft through the aperture; and
     a first plurality of rotor alignment magnets fixedly mounted in the bearing assembly and oriented such that their magnetic axes are substantially parallel to the thrust axis, wherein the first plurality of rotor alignment magnets are mounted to provide two or more opposing pairs of magnets, wherein each pair of magnets is in an alternating pattern of north and south poles facing in a direction away from the motor; and
   a magnet support structure fixedly mounted to the shaft in a spaced apart relation to the bearing assembly, the magnet support structure including a second plurality of rotor alignment magnets mounted to provide two or more opposing pairs of magnets, wherein each pair of magnets is in an alternating pattern of north and south poles facing in a direction toward the bearing assembly;
   wherein the first and second plurality of rotor alignment magnets are positioned such that when the motor is disengaged, attraction between the first and second rotor alignment magnets causes the magnet support structure to rotate relative to the bearing assembly to an alignment position defined by the relative placement of the north and south poles of the rotor alignment magnets.

2. The aircraft engine of claim 1, wherein the alignment position is a position in which a thrust rotor mounted to the shaft is oriented substantially parallel to a longitudinal axis of the aircraft.

3. The aircraft engine of claim 1, wherein the alignment position is a position in which a thrust rotor mounted to the shaft is oriented substantially parallel to the direction of the apparent wind of the aircraft when the aircraft is in motion.

4. The aircraft engine of claim 1, wherein the alignment position is a position in which a thrust rotor mounted to the shaft is oriented within +/− 5° of a longitudinal axis of the aircraft.

5. The aircraft engine of claim 1, further comprising a thrust rotor, wherein the shaft comprises a first portion extending from the motor and supporting the thrust rotor, and a second portion extending from the motor and supporting the magnet support structure.

6. The aircraft engine of claim 5, wherein the first and second portions of the shaft comprise a single shaft extending from at least the thrust rotor to at least the magnet support structure.

7. The aircraft engine of claim 5, wherein the first and second portions of the shaft comprise separate sections of the shaft, each mechanically coupled directly or indirectly to the motor.

8. The aircraft engine of claim 1, wherein the motor is an electric motor or an internal combustion engine.

9. The aircraft engine of claim 1, wherein the bearing assembly further comprises a plurality of mounting points to fixedly mount the motor to an aircraft support structure.

10. An unmanned aircraft, comprising:
    a forward propulsion system comprising a forward thrust engine;

a vertical propulsion system comprising a vertical thrust engine;

a shaft attached to the vertical thrust engine and extending along a thrust axis of the vertical thrust engine;

a thrust rotor fixedly attached to the shaft;

a bearing assembly fixedly mounted to a stator and defining a first surface oriented toward the vertical thrust engine, and a second surface opposite the first surface, the bearing assembly comprising:

an aperture to accept the shaft;

a bearing mounted to the aperture and positioned to rotatably support the shaft through the aperture; and a first plurality of rotor alignment magnets fixedly mounted in the bearing assembly and oriented such that their magnetic axes are substantially parallel to the thrust axis, wherein the first plurality of rotor alignment magnets are mounted to provide two or more opposing pairs of magnets, wherein each pair of magnets is in an alternating pattern of north and south poles facing in a direction away from the vertical thrust engine; and a magnet support structure fixedly mounted to the shaft in a spaced apart relation to the bearing assembly, the magnet support structure including a second plurality of rotor alignment magnets mounted to provide two or more opposing pairs of magnets, wherein each pair of magnets is in an alternating pattern of north and south poles facing in a direction toward the bearing assembly;

wherein the first and second plurality of rotor alignment magnets are positioned such that when the vertical thrust engine is disengaged, attraction between the first and second rotor alignment magnets causes the magnet support structure to rotate relative to the bearing assembly to an alignment position defined by the relative placement of the north and south poles of the rotor alignment magnets.

11. The aircraft of claim 10, wherein the alignment position is a position in which the thrust rotor is oriented substantially parallel to a longitudinal axis of the aircraft.

12. The aircraft of claim 10, wherein the alignment position is a position in which the thrust rotor is oriented substantially parallel to the direction of the apparent wind of the aircraft when the aircraft is in motion.

13. The aircraft of claim 10, wherein the alignment position is a position in which the thrust rotor is oriented within +/− 5° of a longitudinal axis of the aircraft.

14. The aircraft of claim 10, wherein the shaft comprises a first portion extending from the vertical thrust engine and supporting the thrust rotor, and a second portion extending from the vertical thrust engine and supporting the magnet support structure.

15. The aircraft of claim 14, wherein the first and second portions of the shaft comprise a single shaft extending from at least the thrust rotor to at least the magnet support structure.

16. The aircraft of claim 14, wherein the first and second portions of the shaft comprise separate sections of the shaft, each mechanically coupled directly or indirectly to the motor.

17. The aircraft of claim 10, wherein the vertical thrust engine is an electric motor or an internal combustion engine.

18. The aircraft of claim 10, wherein the bearing assembly further comprises a plurality of mounting points to fixedly mount the vertical thrust engine to an aircraft support structure.

19. The aircraft of claim 10, wherein the aircraft comprises a hybrid multirotor unmanned aircraft.

20. An aircraft, comprising:

a forward propulsion system comprising a forward thrust engine and a first rotor coupled to the forward thrust engine;

a vertical propulsion system comprising a vertical thrust engine;

a shaft coupled to the vertical thrust engine and extending along a thrust axis of the vertical thrust engine;

and a second rotor fixedly mounted to a first end of the shaft distal to the vertical thrust engine, wherein a stator is mounted within the second rotor;

a bearing assembly fixedly mounted to the stator and including mounting structures to fixedly mount the vertical thrust engine to a support structure of the aircraft, the bearing assembly including a first plurality of rotor alignment magnets, wherein the first plurality of rotor alignment magnets are mounted to provide two or more opposing pairs of magnets such that each pair of magnets is in an alternating pattern of north and south poles facing in a direction away from the vertical thrust engine;

a magnet support structure fixedly mounted to the shaft in a spaced apart relation to the bearing assembly, the magnet support structure including a second plurality of rotor alignment magnets, wherein the second plurality of rotor alignment magnets are mounted to provide two or more opposing pairs of magnets such that each pair of magnets is in an alternating pattern of north and south poles facing in a direction away from the vertical thrust engine;

wherein the first and second plurality of rotor alignment magnets are positioned such that when the vertical thrust engine is disengaged, attraction between the first and second rotor alignment magnets causes the magnet support structure to rotate relative to the bearing assembly to an alignment position defined by the relative placement of north and south poles of the first and second plurality of rotor alignment magnets.

* * * * *